United States Patent

[11] 3,587,395

| [72] | Inventors | Larry V. Nisley; Klaus P. Mueller; Kenneth G. Kreuter, Goshen, Ind. |
|---|---|---|
| [21] | Appl. No. | 719,495 |
| [22] | Filed | Apr. 8, 1968 |
| [45] | Patented | June 28, 1971 |
| [73] | Assignee | Robertshaw Controls Company, Richmond, Va. |

[54] PNEUMATIC CONTROL SYSTEM AND PARTS THEREFOR OR THE LIKE
44 Claims, 7 Drawing Figs.

[52] U.S. Cl.................................................. 91/47,
91/419, 91/461, 92/98, 236/82
[51] Int. Cl........................................................ F15b 13/042,
F15b 11/08, F16j 3/00
[50] Field of Search........................................... 91/47, 419,
461 (Cursory); 137/85 (Cursory); 236/82, 86, 87

[56] References Cited
UNITED STATES PATENTS

| 2,575,085 | 11/1951 | Alyea | 91/47 |
| 3,006,552 | 10/1961 | Ferris | 236/86 |
| 3,073,345 | 1/1963 | Hagler | 91/47 |
| 3,125,111 | 3/1964 | Daly | 236/86 |
| 3,263,925 | 8/1966 | Joesting | 236/87 |
| 3,080,877 | 3/1963 | Hunt | 137/100 |
| 3,315,730 | 4/1967 | Weaver et al. | 165/23 |

Primary Examiner—Paul E. Maslousky
Attorneys—Auzville Jackson, Jr., Robert L. Marben and Candor, Candor and Tassone ABSTRACT: This disclosure relates to a vacuum temperature control system wherein a pair of vacuum signals respectively from a temperature sensor and a temperature selecting means are translated by a comparator into a vacuum control signal that operates a temperature output means for the system in relation to the vacuum control signal to produce a proportional action thereof, the system, however, having vacuum signal means for resetting the comparator to slowly eliminate the proportional action caused by the comparator.

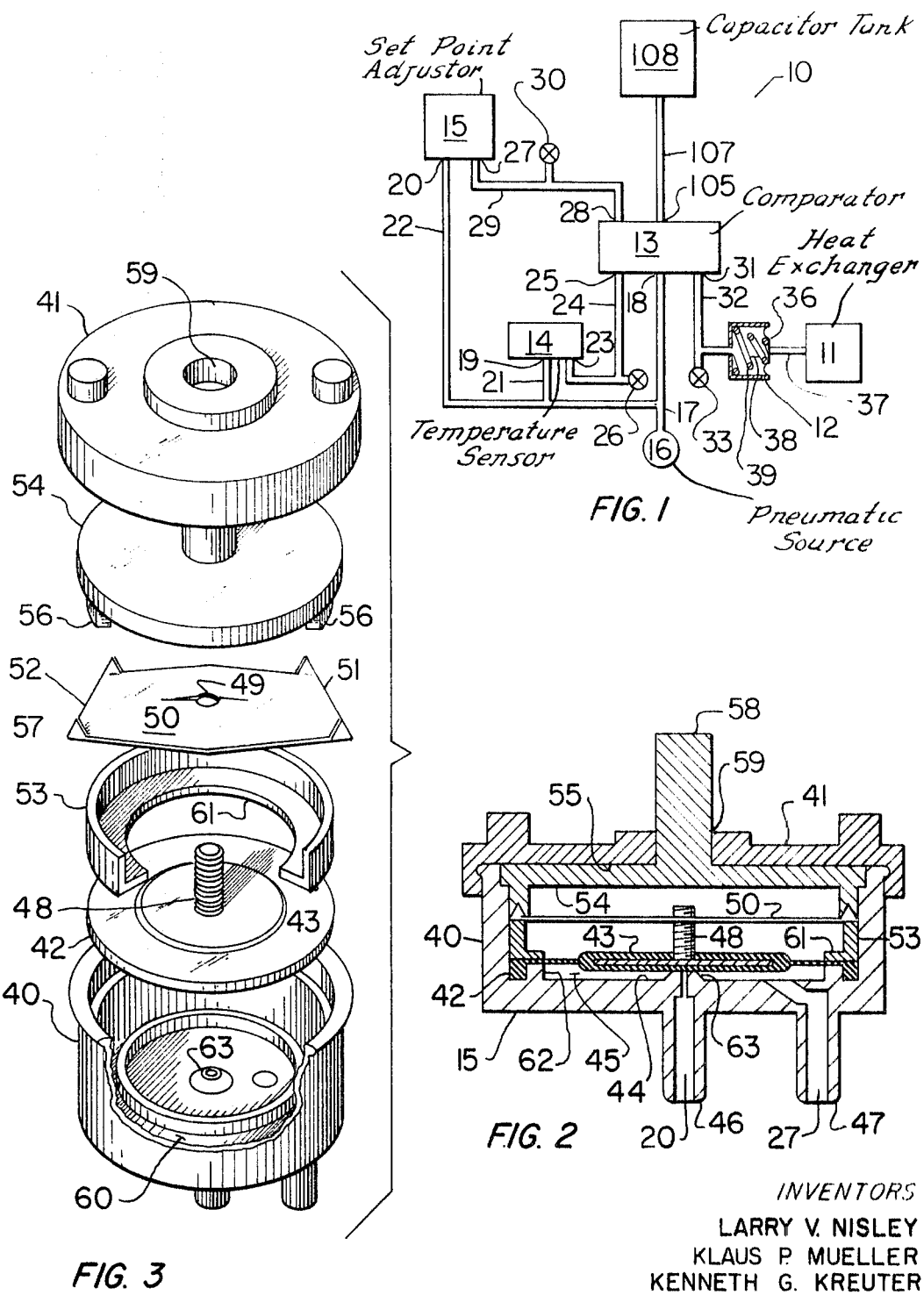

INVENTORS
LARRY V. NISLEY
KLAUS P. MUELLER
KENNETH G. KREUTER

Candor & Candor
ATTORNEYS

PNEUMATIC CONTROL SYSTEM AND PARTS THEREFOR OR THE LIKE

This invention relates to a pneumatic control system and to improved parts for such a control system or the like. This invention also relates to an improved method for operating such a control system or the like.

It is well known that two pneumatic signals can be directed to a comparator so that the comparator will translate the differential in the two signals being received thereby into a control signal being directed from the comparator to a control device to operate the control device in relation to value of the output control signal, the output signal being proportional to the differential of the two pneumatic signals being directed to the comparator.

However, it has been found that when such a pneumatic control system is being utilized to control heat exchanging means, such as an automobile heat exchanging means that includes a heating means and an air-conditioning means, the pneumatic control device that operates the heat exchanging means must be adapted to have a range of actuation thereof that will provide at one end thereof a full heating cycle and at the other end thereof a full cooling cycle in order to provide a suitable, nonoscillating heat exchanging system and not one that is either full cooling or full heating upon a sensing of temperature output above and below a selected temperature.

Thus, such stable nonoscillating heat exchanging system as described above may vary the controlled temperature within a very wide proportional band of temperatures, such as plus or minus 5° F., from the selected temperature as the load on the system varies from that requiring full cooling to that requiring full heating whereby this variation, called "droop" or "offset" cannot normally be tolerated.

Accordingly, one feature of this invention is to solve the above problem by providing an additional signal means on the comparator that will substantially cancel the "droop" so as to provide a satisfactory temperature control system.

In particular, one embodiment of this invention provides an integral or reset action on the comparator which cancels the effect of the proportional action of the output signal from the comparator which created the offset in the first place. The embodiment of this invention providing such integral or reset action includes a means for imposing a pneumatic signal on the comparator diaphragm that measures the differential in the pneumatic signals being directed thereto so as to slowly eliminate the proportional action thereof whereby the system will have substantially no proportional action and, therefore, no "offset" or "droop."

The means of this invention for cancelling the proportional action of the comparator comprises means for interconnecting the output control signal being produced by the comparator to a relay chamber of the comparator by means of a restrictor. In order to obtain a rather long time constant for the integral action, and at the same time employ a restrictor of reasonable size that can be produced at low cost and also be reliable from a nonclogging standpoint, a capacitor tank or the like is interconnected to the relay chamber. The system of this invention thus displays the stability of a plain proportional system and yet has no permanent offset due to varying external loads, supply conditions, internal loads or other variations which would normally produce deviations from the set point temperature as will be apparent hereinafter.

Accordingly, it is an object of this invention to provide an improved pneumatic control system having one or more of the novel features set forth above or hereinafter shown or described.

Another object of this invention is to provide improved parts for such a control system or the like.

A further object of this invention is to provide an improved method for operating such a control system or the like.

Other objects, uses and advantages of this invention are apparent from a reading of this description which proceeds with reference to the accompanying drawings forming a part thereof and wherein:

FIG. 1 is a schematic view illustrating the control system of this invention.

FIG. 2 is a cross-sectional view illustrating the selector means or set point adjuster for the control system of FIG. 1.

FIG. 3 is an exploded perspective view of certain of the parts of the temperature selector of FIG. 2.

Figure 4:
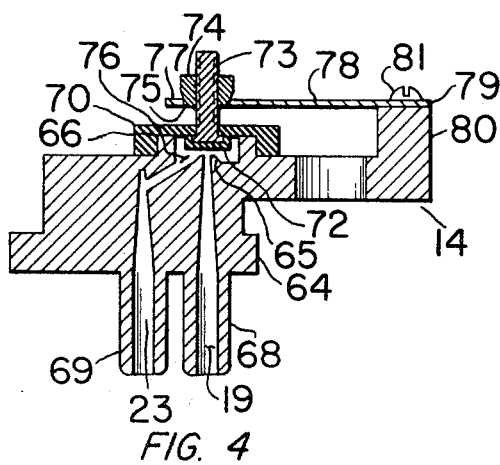
FIG. 4 is a cross-sectional view of the temperature sensor for the control system of FIG. 1.

While the various features of this invention are hereinafter described and illustrated as being particularly adaptable for providing a vacuum temperature control system for the automotive field or the like, it is to be understood that the various features of this invention can be utilized singly or in any combination thereof to provide other types of pneumatic control systems for other types of apparatus.

For example, the control system of this invention could readily provide a temperature control system for a building, home, or the like and could operate with fluid pressures rather than vacuum as will be apparent hereinafter.

Therefore, this invention is not to be limited to only the embodiments illustrated in the drawings, because the drawings are merely utilized to illustrate one of the wide variety of uses of this invention.

Referring now to FIG. 1, the improved control system of this invention is generally indicated by the reference numeral 10 and comprises a heat exchanging means 11 for an automobile or the like that includes the conventional heating means and air-conditioning means, the heat exchanging means 11 being controlled by a pneumatically operated actuator 12 that has a pneumatic output control signal directed thereto by a comparator 13 of this invention. The comparator 13 would normally provide an output signal to the pneumatically operated actuator 12 proportional to the differential in a pair of signals being respectively directed to the comparator by a temperature sensor 14 that is located inside the automobile or the like and a manual selector means or set point adjuster 15 that the operator sets at a desired temperature setting that the control system 10 is to maintain.

The pneumatic source for the system 10 of this invention is indicated by the reference numeral 16 in FIG. 1 and can comprise a vacuum source, such as a vacuum pump, engine vacuum manifold, or the like with the understanding being that the system 10 while hereinafter being described as a vacuum temperature control system could be a pressure operated control system, if desired.

The vacuum source 16 is fluidly interconnected by suitable conduit means 17 to a port means 18 of the comparator as well as to a port means 19 of the temperature sensor 14 and a port means 20 of the selector or set point adjuster 15 by interconnecting conduit means 21 and 22 in the manner illustrated in FIG. 1.

The temperature sensor 14 is adapted to direct a vacuum signal from a port means 23 thereof in relation to the temperature sensed thereby through a conduit means 24 to a port means 25 of the comparator 13, the conduit means 24 having a restrictor 26 therein that interconnects the conduit means 23 to the atmosphere at a controlled rate for a purpose hereinafter described.

Similarly, the selector or set point adjuster 15 is adapted to direct a pneumatic signal from a port means 27 thereof in relation to the temperature setting thereof to a port means 28 of the comparator 13 by means of a conduit means 29 also having a restrictor 30 therein interconnecting the conduit means 29 to the atmosphere at a controlled rate for a purpose hereinafter described.

The comparator 13 measures the differential in the signals being received at the port means 25 and 28 thereof and translates such signal differential into a pneumatic output control signal being directed from a port means 31 thereof to the vacuum operated actuator 12 by means of a conduit means 32 also having a restrictor 33 therein interconnecting the conduit means 32 to the atmosphere at a controlled rate for a purpose hereinafter described.

While the vacuum actuator 12 can comprise any suitable structure, the actuator 12 illustrated in FIG. 1 comprises a cup-shaped housing means 34 having the open end 35 thereof closed by a flexible diaphragm 36 that is interconnected to the heat exchanging means 11 by an actuating post means 37, the diaphragm 36 cooperating with the housing 34 to define a chamber 38 therebetween that is fluidly interconnected to the conduit 32. The diaphragm 36 is normally urged to the right by a compression spring 39 disposed within the chamber 38 so that as the degree of vacuum in the chamber 38 increases in the manner hereinafter described, the diaphragm 36 will be pulled to the left in FIG. 1 by the increasing pressure differential across the diaphragm 36 in opposition to the force of the compression spring 39 and as the degree of vacuum in the chamber 38 decreases in a manner hereinafter described, the resulting decrease in pressure differential across the diaphragm 36 causes the diaphragm 36 to move to the right under the force of the compression spring 39 whereby such movement of the diaphragm 36 and the actuating rod 37 interconnected thereto controls the operation of a heat exchanging means 11. For example, in the embodiment illustrated in the drawings, when the diaphragm 36 of the actuator 12 is moved to the left, the same increases the heating output effect of the heat exchanging means 11 and as the diaphragm 36 is moved to the right in FIG. 1, the same increases the cooling effect of the heat exchanging means 11 so that when the diaphragm 36 is in its full left position, full heating is provided by the heat exchange means 11 and when the diaphragm 36 is in its full right position, the air cooling means of the heat exchanging means 11 is full on as will be apparent hereinafter. Thus, with the diaphragm 36 positioned intermediate its full left and full right positions, various degrees of heating and cooling will be produced by the heat exchanging means 11.

The selector means or set point adjuster 15 of this invention is illustrated in detail in FIGS. 2 and 3 and will now be described.

As illustrated in FIGS. 2 and 3, the selector means of set point adjuster 15 comprises a plurality of housing parts 40 and 41 snap fitted together or otherwise suitably secured together to hold an outer peripheral means 42 of a flexible diaphragm 43 in sealing relation therebetween and against an inside wall means 44 of the housing means 40 to cooperate therewith and define a chamber 45 therebetween that is respectively interconnected to the port means 20 and 27 passing through outwardly extending nipple means 46 and 47 that are fluidly interconnected to the conduit means 22 and 29 previously described. For example, the conduit means 22 and 29 can be flexible and can be telescoped over the nipples 46 and 47. The flexible diaphragm 43 is molded to a threaded stud 48 that extends upwardly therefrom and is threadedly received in a threaded opening 49 of a platelike spring 50 that has its outer ends 51 and 52 respectively held between an annular retainer 53 disposed against the diaphragm 43 and a rotatable disclike member 54 disposed against the inside end wall 55 of the housing member 41, the disclike member 54 having suitable notch means 56 formed therein to receive upwardly extending bent tangs 57 of the spring member 50 so as to spline the spring member 51 and disc member 54 together for a rotational movement for a purpose hereinafter described.

The disc member 54 has a dial shaft 58 extending centrally therefrom and passing outwardly through an opening 59 in the housing member 41 to be interconnected to a control knob or the like (not shown) so that the disc member 54, and, thus, the spring member 50 can be rotated in unison relative to the housing means 40, 41 by the operator rotating the control knob to select a desired temperature setting for the control system 10 in a manner hereinafter described.

The outer periphery 42 of the flexible diaphragm 43 is received in an annular groove 60 formed in the end wall means 44 of the housing member 40 whereby a radially inwardly extending shoulder or annular flange means 61 of the retainer 53 compresses the diaphragm 43 against an outwardly directed annular shoulder means 62 of the housing member 30 to completely seal closed the chamber 45 from the atmosphere. The end wall 44 of the housing member 40 also defines an upwardly extending substantially frustoconical valve seat 63 that fluidly interconnects the port means 20 with the chamber 45, the flexible diaphragm 43 being adapted to open and close the valve seat 63 for a purpose now to be described.

The operator of the control system 10 is adapted to adjust the rotational position of the spring member 50 relative to the threaded stud 48 so as to tend to position the flexible diaphragm 43 relative to the valve seat 63 in order to maintain the vacuum signal being created in the chamber 45 and, thus, in the port means 27 at a predetermined value for the particular setting of the spring member 50 and, thus, for the particular temperature setting of the control knob on the dial shaft 58.

Thus, with the dial shaft 58 set at the desired temperature setting, such as 70° F., the set point adjuster will tend to maintain the vacuum signal being imposed in the port means 27 at a value that corresponds to such temperature setting because as the vacuum source 16 being interconnected at the port means 20 tends to increase the vacuum signal in the chamber 45, the resulting pressure differential across the diaphragm 33 tends to move the diaphragm closer to the valve seat 63 in opposition to the force of the spring member 50 tending to pull the diaphragm 43 upwardly until the restrictor 30 permits sufficient air to be bled into the conduit means 29 to maintain the required vacuum signal in the chamber 45. Conversely, should the vacuum signal in the chamber 45 decrease below the vacuum signal being determined by the setting of the control knob on the shaft 58, the decrease of vacuum in the chamber 45 reduces the pressure differential across the diaphragm 43 so that the spring means 50 will pull the diaphragm 43 further above the valve seat 63 so as to increase the vacuum in the chamber 45 until the same reaches the required vacuum signal value.

In this manner, the selector means or set point adjuster is adapted to maintain the vacuum signal in the conduit means 29 that leads to the port means 28 of the comparator 13 at a predetermined vacuum signal value that is in direct proportional relation to the temperature setting of the control knob on the shaft 58 of the selector means 15 as will be apparent hereinafter.

The temperature sensor 14 of the control system 10 of FIG. 1 is illustrated in detail in FIGS. 4 and 5 and will now be described.

Figure 5:
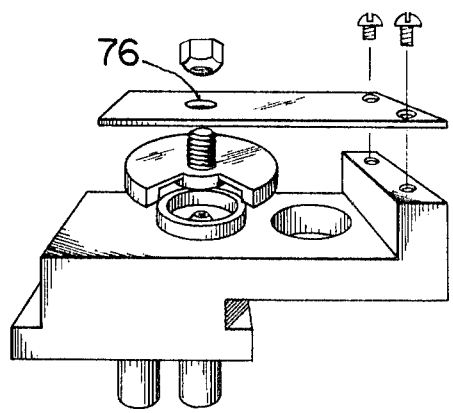
FIG. 5 is an exploded perspective view of certain of the parts of the temperature sensor of FIG. 4.

As illustrated in FIGS. 4 and 5, the temperature sensor 14 comprises a housing means 64 having the port means 19 thereof passing therethrough and leading to a frustoconical valve seat 65 recessed below an annular and concentrically arranged shoulder 66 that cooperates with the valve seat 65 to define an annular chamber 67 disposed in fluid communication with the port means 23. The port means 19 and 23 respectively pass through outwardly extending nipples 68 and 69 that are respectively adapted to be fluidly interconnected to the conduit means 21 and 24 of the system of FIG. 1.

A flexible diaphragm 70 has its outer periphery 71 adapted to be snap fitted over the annular shoulder means 66 of the housing means 64 to seal closed the annular chamber 67 from the atmosphere, the diaphragm 70 having a central projection 72 extending downwardly therefrom and adapted to open and close the valve seat 65 in a manner hereinafter described. A threaded stud 73 is molded to the diaphragm 70 or is otherwise suitably secured thereto so as to extend upwardly therefrom and be threadedly received in a threaded nut 74 that has a substantially hemispherical lower end 75 which engages against a circular opening 76 passing through the left-hand end 77 of a bimetal member 78 that has its right hand end 79 fastened in cantilevered fashion to upwardly extending embossment 80 of the housing member 64 by a plurality of threaded fastening members 81. The opening 76 of the bimetal member 78 loosely receives the diaphragm stud 73 therethrough and is adapted to have the left-hand end 77 adjusted relative to the diaphragm 70 depending upon the threaded relation of the nut 74 on the stud 73 as will be apparent hereinafter.

The operation of the temperature sensor 14 will now be described and it will be assumed that the calibration nut 74 has been adjusted on the stem 73 to a preset position thereof and that the bimetal member 78 will sense the temperature effect produced by the heat exchanging means 11 of the system of FIG. 1.

Should the temperature effect being sensed by the bimetal member 78 increase, the bimetal member 78 tends to have the left-hand end 77 thereof warp upwardly whereby the same engages against the rounded end 75 of the nut 74 and tends to pull the stem 73 and, thus, the intermediate part of the flexible diaphragm 70 vertically upwardly to more fully open the valve seat 65 whereby the vacuum source 16 increases the vacuum signal in the chamber 67 and, thus, in the port means 23 leading to the port means 25 of the comparator 13. Conversely, as the temperature being sensed by the bimetal 78 decreases, the same tends to have the left-hand end 77 thereof moved downwardly in FIG. 4 to move the valve part 72 of the flexible diaphragm 70 closer to the valve seat 65 to decrease the value of the vacuum signal in the chamber 67 and, thus, in the port means 23 that leads to the comparator 13.

The restrictor 26 in the conduit means 24 being interconnected to the port means 23 of the temperature sensor 14 cooperates with the pressure differential across the diaphragm 70 to tend to maintain a constant vacuum signal in the conduit means 24 at a value being determined by the position of the left-hand end 77 of the bimetal member 74 relative to the housing means 64 for any particular temperature being sensed by the bimetal member 78. In particular, as air bleeds into the conduit means 24 from the restrictor 26 at a controlled rate to tend to decrease the value of the vacuum signal in the conduit 24, the value of the vacuum signal in the chamber 67 decreases so that the pressure differential across the diaphragm 70 tending to move the same downwardly in opposition to the spring force of the bimetal member 78 to close the valve seat 65 decreases so that the valve seat 65 is more fully opened by the diaphragm 70 being pulled upwardly by the bimetal member 78 until the vacuum signal in the conduit means 24 reaches the value being determined by the temperature sensing position of the bimetal member 78. Conversely, should the vacuum signal in the conduit means 24 increase beyond the value being determined by the temperature sensed by the bimetal member 78, the increase in vacuum signal in the chamber 67 increases the pressure differential across the diaphragm 70 to cause the diaphragm 70 to move the valve member 72 closer to the valve seat 65 so that the controlled bleed 26 will decrease the vacuum value in the conduit 24 to the proper vacuum rate being determined by the particular temperature being sensed by the bimetal member 78.

Thus, it can be seen that the temperature sensor 14 will maintain a vacuum signal in the conduit means 24 which is proportional to the temperature sensed by the bimetal member 78 and, in the embodiment of this invention, such temperature sensor 14 will maintain a vacuum signal in the conduit 24 in relation to the temperature effect being produced by the heat exchanger means 11 for the interior of an automobile or the like.

The comparator 13 of the control system 10 is illustrated in detail in FIGS. 6 and 7 and will now be described.

Figure 7:
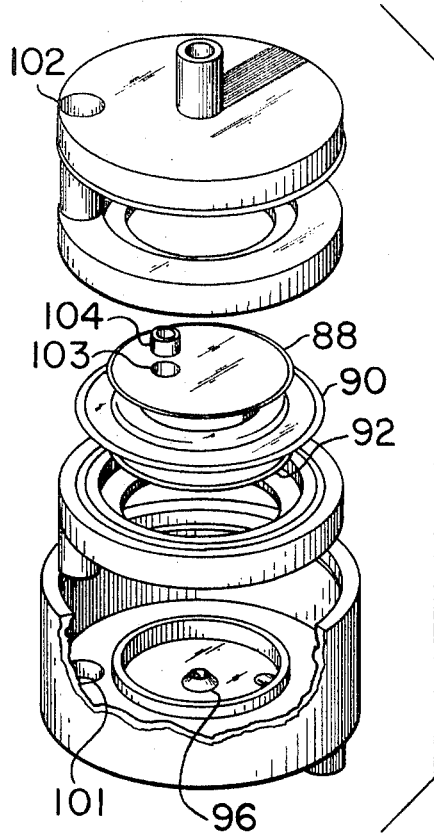
FIG. 7 is an exploded perspective view of certain of the parts of the comparator of FIG. 6.
Figure 6:
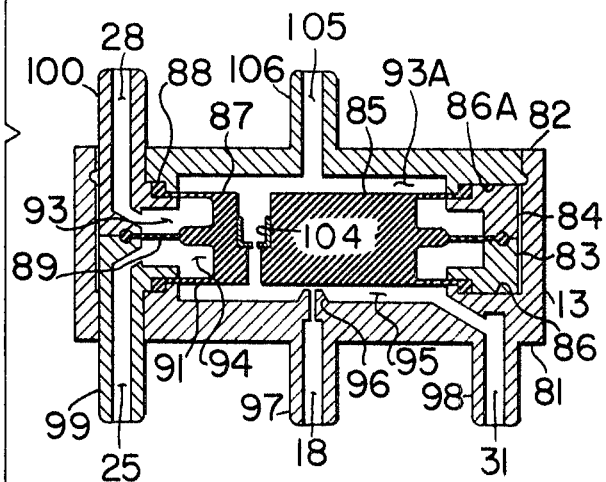
FIG. 6 is a cross-sectional view of the comparator of FIG. 1.

As illustrated in FIGS. 6 and 7, the comparator 13 comprises a pair of housing members 81 and 82 snap fitted together, or otherwise suitably secured together, to hold two annular members 83 and 84 between the opposed end walls 86 and 86A of the housing members 81 and 82, the parts 81, 82, 83 and 84 cooperating together to secure a diaphragm member 85 in the housing means 81, 82 in such a manner that an upper diaphragm flange 87 of the diaphragm member 85 has its outer periphery 88 sealed between the housing part 82 and the annular member 84, an intermediate and larger diaphragm portion or flange 89 of the diaphragm member 85 has its outer periphery 90 secured between the annular members 83 and 84 and a lower diaphragm portion or flange 91 of the diaphragm member 85 has its outer periphery 92 sealed between the annular member 83 and the housing part 81.

In this manner, the upper diaphragm part 87 of the diaphragm member 85 cooperates with the end wall 86A of the housing part 82 to define a chamber 93A therebetween, the intermediate and larger diaphragm portion 89 cooperates with the annular member 84 to define a chamber 93 therebetween and with the annular member 83 to define a chamber 94 therebetween and the lower diaphragm portion 91 cooperates with the end wall 86 of the housing part 81 to define a chamber 95 therebetween. However, the end wall 86 of the housing part 81 has a frustoconical valve seat 96 extending into the chamber 95 to be opened and closed by the lower control portion of the diaphragm member 85 for a purpose hereinafter described, the valve seat 96 being interconnected to the previously described port means 18 that passes through an outwardly extending nipple means 97 of the housing member 81 to be fluidly interconnected to the conduit 17 that leads to the vacuum source 16. The port means 31 also leads to the chamber 95 and passes through an outwardly extending nipple means 98 of the housing part 81 so as to be fluidly interconnected to the conduit means 32 that leads to the pneumatically operated actuator means 12.

The annular members 83 and 84 respectively have outwardly extending nipple means 99 and 100 respectively having the port means 25 and 28 passing therethrough to be respectively interconnected to the chambers 94 and 93 being defined in part by the intermediate diaphragm portion 89, the nipple means 99 and 100 passing outwardly through opening means 101 and 102 in the housing parts 81 and 82 to be fluidly interconnected to the conduit means 24 and 29 respectively leading to the temperature sensor 14 and the selector or set point selector 15.

The chamber 95 of the comparator 13 is interconnected to the chamber 93A by a passage means 103 passing through the diaphragm member 85 and having a cup-shaped orifice member 104 disposed therein to provide a controlled restriction between the chambers 95 and 93A for a purpose hereinafter described. The chamber 93A is disposed in fluid communication with a port means 105 of the comparator 13 that passes through a nipple means 106 thereof adapted to be disposed in fluid communication with a conduit means 107 leading to a capacitor tank 108, FIG. 1, for a purpose hereinafter described.

From the above description of the individual components 13, 14 and 15 of the control system 10 of this invention, it can be seen that each of the components 13, 14 and 15 is formed in a relatively simple manner from a relatively few parts to be simply interconnected together by flexible conduit means to provide a unique control system of this invention which operates in a manner now to be described.

Assuming that the temperature sensor 14 has the bimetal member 78 so constructed and arranged that the same will have the left-hand end 77 thereof moved downwardly upon a decrease of temperature effect sensed thereby and upwardly upon an increase in temperature effect sensed thereby, and assuming that the operator sets the control knob for the set point adjuster or selector means 15 to tend to maintain a temperature effect of 70° F. in the automobile containing the control system 10, the vacuum source 16 is created in any suitable manner, such as by energizing a continuously operating vacuum pump, operating the engine of the automobile to create a suction in the manifold or the like thereof, etc. whereby the created vacuum source 16 begins to evacuate conduits 17, 21 and 22 that respectively lead to the comparator 13, temperature sensor 14 and set point adjuster or selector means 15. Since the set point adjuster or selector means 15 has been set by the control knob on the shaft 58 to provide a vacuum signal in the conduit 29 leading to the comparator 13 at a vacuum value corresponding to the setting of the set point adjuster 15, such vacuum signal is directed to the chamber 93 of the comparator 13 to act against the intermediate diaphragm portion 89 in a manner to tend to pull the diaphragm member 85 upwardly to open its valve seat 96. However, the temperature sensor 14 is also directing a signal into the conduit 24 of a vacuum value that is in relation to the temperature being sensed by the bimetal member 78 so that such vacuum signal being directed to the chamber 94 of the comparator 13 acts on the intermediate diaphragm portion 89 to tend to pull the diaphragm member 85 downwardly.

Of course, if the temperature being sensed by the sensor 14 is exactly at the temperature set by the set point adjuster 15, the vacuum signals in the chambers 93 and 94 of the comparator 13 will be equal so that the diaphragm member 85 will be disposed against the valve seat 96 by a vacuum control signal in the chamber 95 that provides an intermediate output signal into the conduit 32 which holds the actuator 12 in an intermediate position that will cause the heat exchanging means 11 to be intermediate its full cooling and its full heating condition.

However, if the temperature sensed by the temperature sensor 14 falls below the selected temperature, the left-hand end 77 of the bimetal member 78 of the temperature sensor 14 moves downwardly to further close the valve seat 65 thereof so as to decrease the value of the vacuum signal being directed by the conduit 24 to the chamber 94 of the comparator 14. Thus, it can be seen that a pressure differential is now created across the diaphragm portion 89 to tend to move the diaphragm 85 upwardly to increase the value in vacuum signal being produced in the conduit 32 leading from the comparator 13 to actuator 12 whereby the diaphragm 36 of the pneumatic actuator 12 is moved to the left in FIG. 1 in opposition to the force of the compression spring 38 to modulate the heat exchanging means 11 in a manner to produce a greater heating effect thereof. Of course, when an increased heating effect of the heat exchanging means 11 causes the temperature being sensed by the temperature sensor 14 to increase beyond the selected temperature 70° F. as set by the selector means or set point adjuster 15, the bimetal member 78 of the temperature sensor 14 moves upwardly to increase the value of the vacuum signal being directed by the conduit 24 to the chamber 95 of the comparator 13 so that the increased vacuum in the chamber 94 causes the pressure differential across the diaphragm portion 89 to move the diaphragm member 85 downwardly to decrease the signal being directed by the conduit 32 to the pneumatically operated actuator 12 so that the diaphragm 36 moves to the right to increase the cooling effect produced by the heat exchanging means 11 while reducing the heating effect thereof.

In this manner, if the chamber 93A, restricting passage means 103 and tank 108 of this invention were not utilized, it can be seen that the comparator 13 would direct an output control vacuum signal to the pneumatically operated actuator 12 which is substantially proportional to the pressure differential being created in the comparator 13 by the vacuum signals being directed thereto by the set point adjuster 15 and temperature sensor 14.

However, as previously stated, when the output vacuum signal in the conduit 32 being produced by the comparator 13 is always proportional to the signal unbalance being created by the set point adjuster 15 and the temperature sensor 14 in the chambers 93 and 94 of the comparator, the proportional band of control signals being thus produced by the comparator 13 must be tuned to the particular heat exchanging system for which the control system 10 is intended to operate in order to provide a stable nonoscillating system.

Once the range of the signals and the range of the output is established, the proportional band required for stability is established by sizing the effective area of the lower diaphragm portion 91 of the diaphragm member 85 of the comparator 13 in relation to the intermediate or center diaphragm portion 89 thereof. Since the effective surface area of the diaphragm member 85 produced by the vacuum source being interconnected to the port means 18 of the comparator 13 is equal to the large central diaphragm surface area 89 less the lower diaphragm area 81, a relationship can be readily established.

For example, if the vacuum signals being directed by the temperature sensor 14 and set point adjuster 15 are to range over 5 inches Hg. vacuum for a temperature selection band of 20° F. for the control knob of the selector means or set point adjuster 15 so that the same has a selection range of say 60° F. to 80° F., the output vacuum signal for the pneumatically operated actuator 12 is also to range over 5 inches Hg. vacuum as the system goes from a full cooling cycle to a full heating cycle, and the proportional band desired has been determined to be 10° F., then the net signal area (large diaphragm 89 area minus small diaphragm 91 area) must be twice the output diaphragm 91 area. Thus, the ratio of areas of the center diaphragm 99 to the lower diaphragm 91 will be three to one. The upper small diaphragm portion 87 is chosen to be the same size as the lower small diaphragm 91 in area so as to provide an equal net area for both signals being directed to the chambers 93 and 94 of the comparator 13.

As previously stated, if the novel features of the reset chamber 93A of the comparator 13 of this invention were not included, the comparator 13 would cause the system to have a stable control with a proportional band of 10° F. This, however, means that the control temperature for a given setting of the selector means or set point adjuster 15 will vary plus or minus 5° F. from the set point temperature thereof as the load on the system varies from that requiring full cooling to that requiring full heating. If this variation, droop or offset, could be tolerated, such a pneumatic control system would be satisfactory.

However, in certain automobile heat exchanging systems, as well as in building and residential heat exchanging systems, such a wide droop or offset cannot be tolerated so as to permit this variation and, therefore, one of the features of this invention is to add an additional function to the control system 10 to substantially eliminate the droop or offset.

For example, one approach of this invention to solve the droop or offset problem described above is to provide an additional signal to the comparator 13 which will be a measure of the lead that causes a variance from full cooling to full heating, such as the outside temperature and which would be connected to the port means 104 of the comparator 13 to operate in a manner hereinafter described. Thus, if this additional signal at the port means 104 ranged over the same 5 inches Hg. vacuum as the load varied in its full range, such a signal would exactly cancel the droop and a satisfactory control system would result.

While one of the features of this invention is to provide such a load responsive signal to the comparator 13, other load variations could be utilized for such an additional signal. For example, there is a variance in solar load, velocity, wind, etc., particularly in an automotive heat exchanging system, that could be utilized.

However, the embodiment of this invention illustrated in the drawings adds an integral or reset action to the comparator 13 which cancels the effect of the comparator output vacuum control signal that produced the proportional action and, thus, the offset or droop in the first place. While it is realized that the proportional action of the comparator 13 is mandatory for stability, it has been found that if the proportional action effect is slowly eliminated, the resulting control system will have no proportional action and, therefore, no offset.

For example, since the chamber 95 of the comparator 13 is interconnected to the relay chamber 93A by the restriction means 104 and the relay chamber 93A is, in turn, interconnected by the conduit means 107 to the capacitance tank 108, the output control vacuum of the comparator 13 in the chamber 95 thereof bleeds through the restrictor 104 and into the capacitance tank 108 until such time that the vacuum value in the capacitance tank 108 is equal to the control vacuum value in the chamber 95 and, thus, leading to the pneumatic actuator 12.

Thus, it can be seen that when the capacitance tank vacuum is less than the control pressure in the chamber 95, the pressure differential across the diaphragm member 85 produced by the different vacuum values in chambers 95 and 93A causes the diaphragm member 85 to move upwardly away from the valve seat 96 to increase the value of the control vacuum in the chamber 95. Conversely, when the vacuum in the capacitance tank 108 and chamber 93A is greater than the control vacuum in the chamber 95, the resulting pressure differential across the diaphragm member 85 causes the diaphragm member 85 to move downwardly in a manner to throttle off the valve seat 96 until the bleed of air through the restrictor 33 into the conduit means 32 has increased the control vacuum in the chamber 95 to equal the vacuum value in the relay chamber 93A, and, thus, in the capacitance tank 108.

Accordingly, if the chamber 93A of the comparator 13 were merely connected or vented to the atmosphere without an interconnection between the chambers 93A and 95, and if the two vacuum signals being directed to the chambers 93 and 94 respectively by the set point adjuster 15 and temperature sensor 14 were equal, the comparator 13 would be balanced with zero vacuum output at the conduit 32 as the diaphragm assembly 85 would close the valve seat 96 under the pressure differential between the chamber 93A and vacuum port means 18.

Under these conditions, when the vacuum signal to the upper chamber 93 is increased to a higher vacuum signal by the set point adjuster 15 than the vacuum signal being directed to the chamber 94 by the temperature sensor 14, the diaphragm member 85 will move upwardly permitting the vacuum supply port means 18 to increase the vacuum signal being directed by the port means 31 to the pneumatically operated actuator 12 until the increased vacuum value in the output chamber 95 produced a downward pressure differential force on the diaphragm member 85 equal to the signal unbalance produced by the chambers 93 and 94 so that at this time the center section of the diaphragm member 85 would move downwardly so as to hover on the vacuum supply valve seat 96 and maintain the output vacuum at the particular level whereby the output vacuum signal in the port means 31 would merely be a simple proportional action that is always proportional to the signal unbalance produced at the chambers 93 and 94. This proportional change of the heat exchanging means 11 while changing its output effect may not produce the temperature effect set by the set point adjuster 15 because of the change in load, such as outside temperature, that caused the signal unbalance to the chambers 93 and 94 whereby the interior of the automobile or the like will not be at the set control temperature of 70° F.

However, as previously stated, the integral action or reset of the chamber 93A of the comparator 13 of this invention will slowly eliminate the proportional action so that the previously described droop or offset of a strictly proportional system is eliminated.

For example, should the control system 10 of this invention be functioning to produce a temperature of 70° F. and there is a sudden change in the outside load or temperature that would normally cause a strictly proportional system to cause the heat exchanging means 11 to increase its heating effect, the temperature sensor 14 would immediately decrease the vacuum signal being directed thereby to the chamber 94 of the comparator 13 so that the resulting pressure differential across the intermediate part 89 of the diaphragm member 85 moves the diaphragm member 85 upwardly so as to increase the output vacuum signal being produced in the chamber 95 and directed to the pneumatically operated actuator 12 to move the diaphragm 36 toward the left to cause such an increased heating operation. However, since the vacuum control signal increases in the chamber 95, by such sudden outside load variation, the vacuum value in the reset chamber 93A of the comparator 13 is at a lower value than the value of the vacuum now being produced in the control chamber 95 so that there is a bleed of pressure from the chamber 93A and tank 108 through the restrictor 104 into the control chamber 95 to increase the vacuum value in chamber 93A so as to cause diaphragm 55 to further move away from valve seat 96 to further increase the vacuum signal directed to actuator 12 to further increase the heating effect of the exchanger 11 an amount equal to the amount caused by the initial signal unbalance in chambers 93 and 94 in a time period determined by the size of the restrictor 104 and capacitance tank 108. This resetting action is repeated until the signals in chambers 93 and 94 are equal. At this time, the actuator 12 is at a new heating position that is sufficient to just maintain the temperature effect in the automobile or the like at the control temperature setting of the set point adjuster 15.

Conversely, should the load variation on the system 10 be one that would require increased cooling of the heat exchanging means 11, the temperature sensor 14 immediately increases the vacuum signal being directed by the conduit means 24 to the chamber 94 of the comparator 13 so that the resulting unbalance between the chambers 93 and 94 moves the diaphragm member 85 downwardly to decrease the vacuum signal in the control chamber 95 leading to the pneumatically operated actuator 12 so as to move the diaphragm 36 to the right for an increased cooling operation of the heat exchanging means 11. However, since the vacuum value in the relay chamber 93A and tank 108 is now greater than the vacuum value in the control chamber 95, the pressure in the chamber 95 bleeds through the restrictor 104 into the chamber 93A and tank 108 so as to decrease the vacuum value in chamber 93A so as to cause the diaphragm 55 to further move toward the valve seat 96 to further decrease the vacuum signal directed to actuator 12 to further increase the cooling effect of the exchanger 11 an amount equal to the amount caused by the initial signal unbalance in chambers 93 and 94 in a time period determined by the size of the restrictor 104 and capacitance tank 108. This resetting action is repeated until the signals directed to chambers 93 and 94 are equal. At this time the actuator 12 is at a new cooling position that is sufficient to just maintain the temperature effect in the automobile or the like at the control temperature setting of the set point adjuster 15.

Thus, it can be seen that the restrictor means 104 and capacitance tank 108 for the comparator 13 slowly eliminates a proportional action of the comparator 13 and if this rate is slow enough in relation to the system time constants so as not to produce instability in the system, the integral or reset action can take place fast enough so a temporary offset produced by a load or set point adjust or change will not be judged uncomfortable by the user.

Thus, in order to obtain a rather long time constant for the integral action and at the same time employ a restrictor member 104 of reasonable size that can be produced at a low cost and also be reliable from a nonclogging standpoint, the size of the capacitance tank 108 can be determined in relation to an optimum minimum restrictor size. In this manner, the system 10 will display the stability of a plain proportional system and yet have no permanent offset due to external loads, supply conditions, internal loads or other variations which would normally produce deviation from the set point of the adjuster 15.

For example, in automobiles and the like, an internal load variation can be caused when the number of passengers in the automobile is reduced in cold weather so that the body heat originally produced thereby will be substantially reduced so that the temperature sensor 14 will demand increased heat. An outside load variation could be the driving of the automobile from Southern states to Northern states.

Thus, whenever the system 10 of this invention has a load variation requiring more heat or more cooling, the comparator 13 provides such action while the reset function of the chamber 93A and tank 108 assures that the set control temperature will be reached by the output effect of the heat exchanger.

Accordingly, it can be seen that the control system 10 of this invention not only provides an improved control system for automobiles, buildings and the like, but also this invention provides improved parts for such a control system or the like.

However, since the various parts of the system 10 of this invention are relatively small and rugged, the same are readily adapted to withstand shocks and vibrations normally encountered in the transportation field, such as in aircraft, boats and land vehicles, whereby the accuracy of the system of this invention will be maintained.

While the form of the invention now preferred has been described as required by the statutes, other forms may be utilized which come within the scope of the claims which follow.

We claim:

1. A pneumatic control system for a transportation vehicle subjected to shocks and vibrations, said system comprising a pneumatic source, a pneumatically operated control device, a comparator having means for interconnecting a pneumatic control signal from said source to said device proportionally to the degree of actuation of said comparator caused by the differential between two pneumatic signals imposed thereon whereby said control signal received thereby is actuated proportionally to said control signal received thereby, a condition sensor interconnected to said source to direct one of said signals from said source to said comparator in relation to the condition sensed thereby, a selector means interconnected to said source to direct the other of said signals to said comparator in relation to the setting thereof, and automatic means for repetitively resetting said comparator to automatically change the control signal being directed therefrom to said control device until said two pneumatic signals imposed on said comparator are equal so as to substantially cancel said proportional actuation of said control device.

2. A pneumatic control system as set forth in claim 1 wherein said condition sensor is a temperature sensing device.

3. A pneumatic control system as set forth in claim 1 wherein said selector means is infinitely adjustable between the limits thereof.

4. A pneumatic control system as set forth in claim 1 wherein said source is a vacuum source.

5. A pneumatic control system as set forth in claim 4 wherein said condition sensor has a conduit means that fluidly interconnects its vacuum signal to said comparator, said conduit means having a restrictor that fluidly interconnects the atmosphere to said vacuum signal at a controlled rate.

6. A pneumatic control system as set forth in claim 4 wherein said selector means has a conduit means that fluidly interconnects its vacuum signal to said comparator, said conduit means having a restrictor that fluidly interconnects the atmosphere to said vacuum signal at a controlled rate.

7. A pneumatic control system as set forth in claim 4 wherein said comparator has a conduit means that fluidly interconnects its vacuum signal to said control device, said conduit means having a restrictor that fluidly interconnects the atmosphere to said vacuum signal at a controlled rate.

8. A pneumatic control system as set forth in claim 1 wherein said automatic means comprises means for imposing a resetting pneumatic signal on said comparator.

9. A pneumatic control system as set forth in claim 8 wherein said comparator has passage means fluidly interconnecting said resetting signal to said control signal.

10. A pneumatic control system as set forth in claim 9 wherein said passage means has restrictor means therein for fluidly interconnecting said resetting signal and said control signal together at a controlled rate to slowly cancel said proportional action of said control device.

11. A pneumatic control system as set forth in claim 10 wherein a capacitance tank is fluidly interconnected to said passage means on the side of said restrictor means that is opposite to the side of the restrictor means that is interconnected to said control signal.

12. A method for operating a pneumatically operated control device in a transportation vehicle that is subjected to shocks and vibrations, said method comprising the steps of directing a pneumatic control signal from a pneumatic source to said device from a comparator proportionally to the degree of actuation of said comparator caused by the differential between two pneumatic signals imposed thereon whereby said control device is actuated proportionally to said control signal received thereby, directing one of said signals from said source to said comparator in relation to a condition sensed by a condition sensor, directing the other signal from said source to said comparator in relation to the setting of a selector means, and automatically and repetitively resetting said comparator by automatic means to change the control signal being directed therefrom to said actuator until said two pneumatic signals imposed on said comparator are equal so as to substantially cancel said proportional actuation of said control device.

13. A method as set forth in claim 12 and including the step of making said condition sensor from a temperature sensing device.

14. A method as set forth in claim 12 and including the step of making said selector means infinitely adjustable between limits thereof.

15. A method as set forth in claim 12 and including the step of providing said pneumatic source from a vacuum source.

16. A method as set forth in claim 15 and including the steps of interconnecting the vacuum signal of said condition sensor to said comparator with a conduit means, and providing a restrictor in said conduit means that fluidly interconnects the atmosphere to said vacuum signal at a controlled rate.

17. A method as set forth in claim 15 and including the steps of fluidly interconnecting the vacuum signal of said selector means to said comparator with a conduit means, and providing a restrictor in said conduit means that fluidly interconnects the atmosphere to said vacuum signal at a controlled rate.

18. A method as set forth in claim 15 and including the steps of fluidly interconnecting the vacuum control signal of said comparator to said control device with a conduit means, and providing a restrictor in said conduit means that fluidly interconnects the atmosphere to said vacuum signal at a controlled rate.

19. A method as set forth in claim 12 wherein said step of automatically causing said comparator to automatically change the control signal being directed therefrom comprises the step of imposing a resetting pneumatic signal on said comparator.

20. A method as set forth in claim 19 wherein said step of imposing said resetting pneumatic signal on said comparator includes the step of fluidly interconnecting said resetting signal to said control signal by a passage means.

21. A method as set forth in claim 20 and including the step of fluidly interconnecting said resetting signal and said control signal together at a controlled rate by a restrictor means in said passage means to slowly cancel said proportional action of said control device.

22. A method as set forth in claim 21 and including the step of fluidly interconnecting a capacitance tank to said passage means on the side of said restrictor means that is opposite to the side of the restrictor means that is interconnected to said control signal.

23. In a comparator construction for interconnecting a pneumatic control signal from a pneumatic source to a pneumatically operated device proportionally to the degree of actuation of said comparator construction caused by a differential between two other pneumatic signals imposed on a diaphragm member thereof that provides said control signal in order to proportionally actuate said control device in relation to said control signal received thereby, the improvement comprising automatic means for repetitively resetting said comparator to automatically change the control signal being directed therefrom to said control device until said two pneumatic signals imposed on said diaphragm member are equal so as to substantially cancel said proportional actuation of said control device.

24. In a comparator construction as set forth in claim 23, said automatic means comprises means for imposing a resetting pneumatic signal on said comparator construction.

25. In a comparator construction for interconnecting a pneumatic control signal from a pneumatic source to a pneumatically operated device proportionally to the degree of actuation of said comparator construction caused by the differential between two pneumatic signals imposed on a diaphragm member thereof that provides said control signal in order to proportionally actuate said control device in relation to said control signal received thereby, the improvement comprising automatic means for repetitively resetting said comparator to automatically change the control signal being directed therefrom to said control device until said two pneumatic signals imposed on said diaphragm member are equal so as to substantially cancel said proportional actuation of said control device, said automatic means comprising means for imposing a resetting pneumatic signal on said comparator construction, said last-named means comprising passage means for fluidly interconnecting said resetting signal to said control signal.

26. In a comparator construction as set forth in claim 25, said diaphragm member having said passage means passing therethrough.

27. In a comparator construction as set forth in claim 26, said passage means has restrictor means therein for fluidly interconnecting said resetting signal and said control signal together at a controlled rate that would slowly cancel said proportional action of said control device.

28. In a comparator construction as set forth in claim 27, a capacitance tank being fluidly interconnected to said passage means on the side of said restrictor means that is opposite to the side of the restrictor means that is interconnected to said control signal.

29. In a method for operating a comparator construction that is adapted to interconnect a pneumatic control signal from a pneumatic source to a pneumatically operated device proportionally to the degree of actuation of said comparator construction caused by a differential between two other pneumatic signals being imposed on a diaphragm member thereof that provides said control signal in order to proportionally actuate said control device in relation to said control signal received thereby, the improvement comprising the step of automatically and repetitively resetting said comparator by automatic means to change the control signal being directed therefrom to said control device until said two pneumatic signals imposed on said comparator are equal so as to substantially cancel said proportional action of said control device.

30. In a method as set forth in claim 29, said step of automatically resetting said comparator to change said control signal comprising the step of imposing a resetting pneumatic signal on said comparator construction.

31. In a method for operating a comparator construction that is adapted to interconnect a pneumatic control signal from a pneumatic source to a pneumatically operated device proportionally to the degree of actuation of said comparator construction caused by a differential between two pneumatic signals being imposed on a diaphragm member thereof that provides said control signal in order to proportionally actuate said control device in relation to said control signal received thereby, the improvement comprising the step of automatically and repetitively resetting said comparator by automatic means to change the control signal being directed therefrom to said control device until said two pneumatic signals imposed on said comparator are equal so as to substantially cancel said proportional action of said control device, said step of automatically resetting said comparator to change said control signal comprising the step of imposing a resetting pneumatic signal on said comparator construction, said last-named step comprising the step of fluidly interconnecting said resetting signal to said control signal with a passage means.

32. In a method as set forth in claim 31, said last-named interconnecting step comprising the step of forming said passage means through said diaphragm member.

33. In a method as set forth in claim 32, said last-named interconnecting step comprising the step of fluidly interconnecting said resetting signal and said control signal together at a controlled rate with a restrictor means that would slowly cancel said proportional action of said control device.

34. In a method as set forth in claim 33, the additional step of fluidly interconnecting a capacitance tank to said passage means on the side of said restrictor means that is opposite to the side of the restrictor means that is interconnected to said control signal.

35. A vacuum control system comprising a vacuum source, a vacuum operated control device, a comparator having means for interconnecting a vacuum control signal from said source to said device proportionally to the degree of actuation of said comparator caused by the differential between two other vacuum signals imposed thereon whereby said control device is actuated proportionally to said control signal received thereby, a first means interconnected to said source to direct one of said signals from said source to said comparator in relation to the condition of said first means, a second means interconnected to said source to direct the other of said signals to said comparator in relation to the condition thereof, and automatic means for repetitively resetting said comparator to automatically change the control signal being directed therefrom to said control device until said two vacuum signals imposed on said comparator are equal so as to substantially cancel said proportional actuation of said control device.

36. A vacuum control system as set forth in claim 35 wherein said automatic means comprises means for imposing a resetting vacuum signal on said comparator.

37. A vacuum control system comprising a vacuum source, a vacuum operated control device, a comparator having means for interconnecting a vacuum control signal from said source to said device proportionally to the degree of actuation of said comparator caused by the differential between two vacuum signals imposed thereon whereby said control device is actuated proportionally to said control signal received thereby, a first means interconnected to said source to direct one of said signals from said source to said comparator in relation to the condition of said first means, a second means interconnected to said source to direct the other of said signals to said comparator in relation to the condition thereof, and automatic means for repetitively resetting said comparator to automatically change the control signal being directed therefrom to said control device until said two vacuum signals imposed on said comparator are equal so as to substantially cancel said proportional actuation of said control device, said automatic means comprising means for imposing a resetting vacuum signal on said comparator, said comparator having passage means fluidly interconnecting said resetting signal to said control signal.

38. A vacuum control system as set forth in claim 36 wherein said passage means has restrictor means therein for fluidly interconnecting said resetting signal and said control signal together at a controlled rate to slowly cancel said proportional action of said control device.

39. A vacuum control system as set forth in claim 38 wherein a capacitance tank is fluidly interconnected to said passage means on the side of said restrictor means that is opposite to the side of the restrictor means that is interconnected to said control signal.

40. A method for operating a vacuum operated control device comprising the steps of directing a vacuum control signal from a vacuum source to said device from a comparator proportionally to the degree of actuation of said comparator caused by the differential between two other vacuum signals imposed thereon whereby said control device is actuated proportionally to said control signal received thereby, directing one of said signals from said source to said comparator in relation to a condition of a first means, directing the other signal from said source to said comparator in relation to the condition of a second means, and automatically and repetitively resetting said comparator by automatic means to change the control signal being directed therefrom to said actuator until said two vacuum signals imposed on said comparator are equal so as to substantially cancel said proportional actuation of said control device.

41. A method as set forth in claim 40 wherein said step of automatically causing said comparator to automatically change the control signal being directed therefrom comprises the step of imposing a resetting vacuum signal on said comparator.

42. A method for operating a vacuum operated control device comprising the steps of directing a vacuum control signal from a vacuum source to said device from a comparator proportionally to the degree of actuation of said comparator caused by the differential between two vacuum signals imposed thereon whereby said control device is actuated proportionally to said control signal received thereby, directing one of said signals from said source to said comparator in relation to a condition of a first means, directing the other signal from said source to said comparator in relation to the condition of a second means, and automatically and repetitively resetting said comparator by automatic means to change the control signal being directed therefrom to said actuator until said two vacuum signals imposed on said comparator are equal so as to substantially cancel said proportional actuation of said control device, said step of automatically causing said comparator to automatically change the control signal being directed therefrom comprising the step of imposing a resetting vacuum signal on said comparator, said step of imposing said resetting vacuum signal on said comparator including the step of fluidly interconnecting said resetting signal to said control signal by a passage means.

43. A method as set forth in claim 42 and including the step of fluidly interconnecting said resetting signal and said control signal together at a controlled rate by a restrictor means in said passage means to slowly cancel said proportional action of said control device.

44. A method as set forth in claim 43 and including the step of fluidly interconnecting a capacitance tank to said passage means on the side of said restrictor means that is opposite to the side of the restrictor means that is interconnected to said control signal.